United States Patent
Michel et al.

(10) Patent No.: US 6,634,178 B1
(45) Date of Patent: Oct. 21, 2003

(54) METHOD FOR ADJUSTING THE PRESSURE IN A CRYOGENIC TANK AND CORRESPONDING DEVICE

(75) Inventors: Friedel Michel, Erkrath (DE); Heinz Koser, Rodgau (DE); Rainer Schmitt, Hanau (DE)

(73) Assignee: Messer Griesheim GmbH (DE)

( * ) Notice: Subject to any disclaimer, the term of this patent is extended or adjusted under 35 U.S.C. 154(b) by 0 days.

(21) Appl. No.: 10/048,420
(22) PCT Filed: Jul. 12, 2000
(86) PCT No.: PCT/EP00/06603

§ 371 (c)(1),
(2), (4) Date: May 31, 2002

(87) PCT Pub. No.: WO01/07825

PCT Pub. Date: Feb. 1, 2001

(30) Foreign Application Priority Data

Jul. 27, 1999 (DE) .......................... 199 34 457

(51) Int. Cl.[7] .................................................. F17C 5/02
(52) U.S. Cl. ......................................... 62/47.1; 62/48.1
(58) Field of Search .................................. 62/47.1, 48.1

(56) References Cited

U.S. PATENT DOCUMENTS

| | | | | |
|---|---|---|---|---|
| 2,842,942 A | * | 7/1958 | Johnston et al. | 62/48.1 |
| 3,096,625 A | * | 7/1963 | Legatski | 62/47.1 |
| 3,650,290 A | * | 3/1972 | Moen et al. | 137/339 |
| 3,776,275 A | * | 12/1973 | Updike | 137/625.4 |
| 5,373,700 A | * | 12/1994 | McIntosh | 62/48.1 |
| 5,644,921 A | * | 7/1997 | Chowdhury | 62/48.1 |

FOREIGN PATENT DOCUMENTS

| | | | |
|---|---|---|---|
| CH | 102269 | * | 12/1923 |
| DE | 38 44 327 A1 | * | 7/1990 |
| DE | 43 20 446 A1 | * | 12/1994 |

* cited by examiner

Primary Examiner—Ronald Capossela
(74) Attorney, Agent, or Firm—Connolly Bove Lodge & Hutz

(57) ABSTRACT

In a prior-art method to regulate the pressure inside a cryogenic tank containing cold gas when a main stream for a consumer is withdrawn, heated gas in the form of a heating gas secondary stream, which is regulated as a function of the tank pressure, is fed through the cryogenic tank via a pipe. In order to start on this basis and to provide a simple and safe operating method to regulate the main stream and the secondary stream while also providing a cost-efficient device for this purpose, it is proposed by the method according to the invention that the secondary stream and the main stream be fed to a pressure-control means equipped with a first adjustable throttle for the secondary stream and with a second adjustable throttle for the main stream, whereby the throttles are coupled to each other in such a way that they can be opened and closed in opposite directions as a function of the pressure in the tank. The device suitable for this purpose comprises a pressure-control means with which a gas stream in the form of a heating gas secondary stream, which is regulated as a function of the pressure in the tank, is conveyed through the pipe, whereby the pressure-control means is equipped with a first adjustable throttle to regulate the secondary stream and with a second adjustable throttle to regulate the main stream, and these throttles are coupled to each other in such a way that they can be opened and closed in opposite directions as a function of the pressure in the tank (FIG. 2).

20 Claims, 2 Drawing Sheets

METHOD FOR ADJUSTING THE PRESSURE IN A CRYOGENIC TANK AND CORRESPONDING DEVICE

Figure 1:
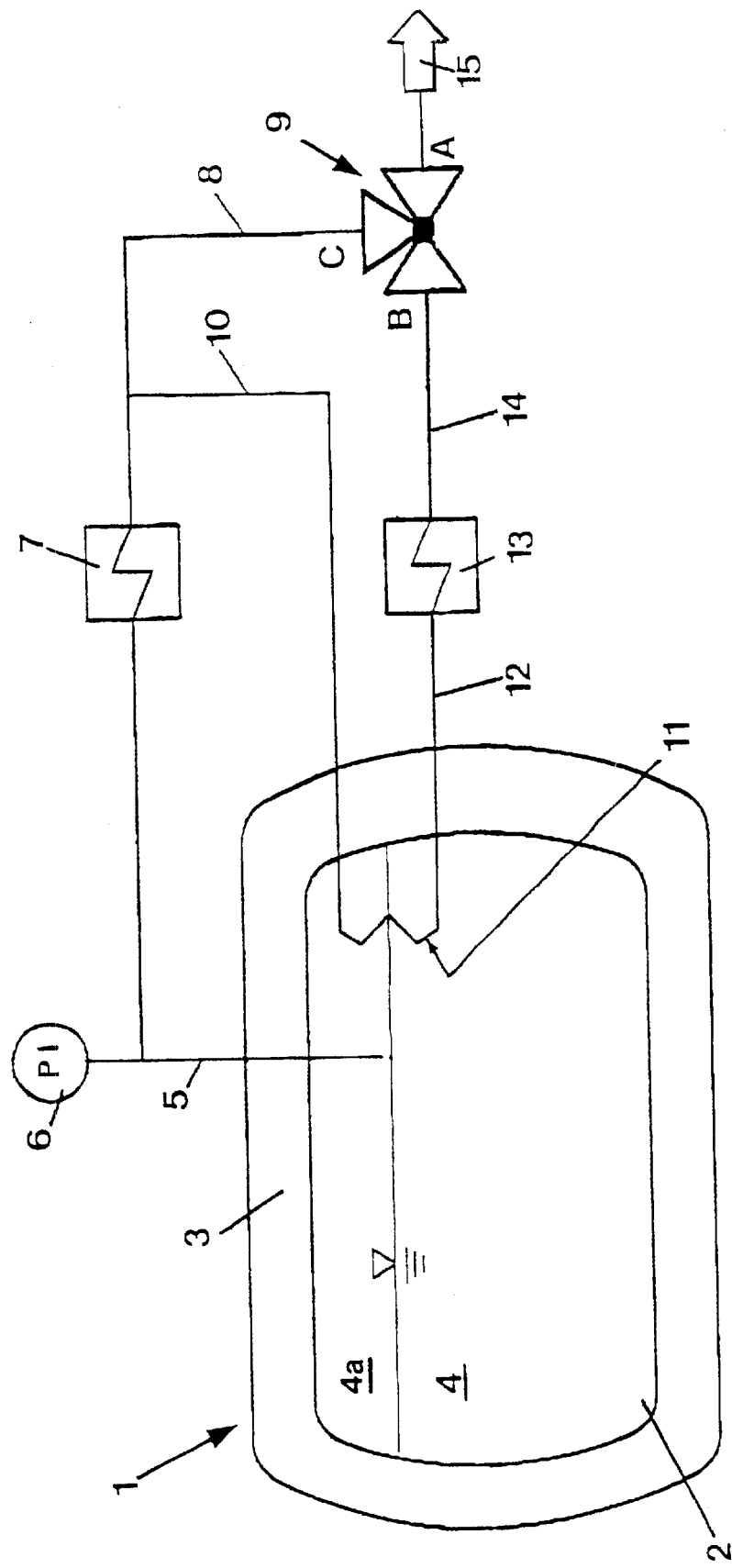

The invention relates to a method to regulate the pressure inside a cryogenic tank containing cold gas when a main stream for a consumer is withdrawn, whereby heated gas in the form of a heating gas secondary stream, which is regulated as a function of the tank pressure, is fed through the cryogenic tank via a pipe.

Moreover, the invention relates to a device to regulate the pressure inside a cryogenic tank when at least one main stream for a consumer is withdrawn, said device having a thermally insulated reservoir to hold a cold gas that is connected to a withdrawal line that serves to withdraw a gas stream, having a device to heat up the gas stream, having a pipe that runs through the reservoir, and having a pressure-control means with which the gas stream in the form of a heating gas secondary stream, which is regulated as a function of the tank pressure, is fed through the cryogenic tank via the pipe.

A cryogenic tank is a heat-insulated reservoir that holds liquid, deep-frozen gases. The term "cold gas" as used here and below also refers to liquefied gases. Such cryogenic tanks are employed, for example, in automotive technology as fuel tanks. They can contain liquid hydrogen, liquid natural gas, liquid nitrogen or the like. Hydrogen, in particular, is an especially environmentally friendly fuel since only water vapor is formed when it is burned. This is why great importance is ascribed to hydrogen when it comes to future-oriented automobile concepts. In order to be liquefied, hydrogen is cooled down to a temperature below −253° C. [−423.4° F.] and then stored in liquid form at a slight excess pressure in such a cryogenic tank. The pressure in the cryogenic tank drops when gas or liquefied gas is withdrawn. However, in many applications such as, for instance, the above-mentioned use as a fuel tank, the pressure in the tank has to be kept as constant as possible.

For purposes of regulating the pressure when a main stream for a consumer is withdrawn from a cryogenic tank, DE-A 196 45 492 proposes a method and a device of the above-mentioned type in the form of a so-called "intrinsic gas convector" whereby, in order to maintain or increase the pressure, heated gas in the form of a "heating gas secondary stream" is fed through a pipe that runs through the reservoir. The heat that is introduced into the cryogenic tank in this process promotes the evaporation of liquefied gas, thus increasing the tank pressure. The pressure drop in the reservoir caused by the withdrawal of the main stream can thus be equalized once again by a controlled circulation of the hot secondary stream. In the prior-art device, the heating gas secondary stream is conveyed in a closed circulation system and the throughput is regulated by a control valve as a function of the pressure in the tank. Even though the throughput of the requisite secondary stream is at a certain ratio relative to the throughput of the main stream conveyed to the consumer, it can vary over a wide range, depending on the design and operating conditions of the cryogenic tank and on the requirements of the consumer. The problem also arises that, depending on the quantity consumed, the main stream has to be throttled to different degrees, although the pressure drop between the reservoir and the consumer should remain as constant as possible. With the prior-art device and with the prior-art regulation methods, these requirements can only be met with highly complicated control technology and equipment.

The invention has the objective of creating a simple and safe operating method to regulate the main stream and the secondary stream while also providing a cost-efficient device for this purpose.

As far as the method is concerned, this objective is achieved according to the invention on the basis of the prior-art method in that the secondary stream and the main stream are fed to a pressure-control means equipped with a first adjustable throttle for the secondary stream and with a second adjustable throttle for the main stream, whereby the throttles are coupled to each other in such a way that they can be opened and closed in opposite directions as a function of the pressure in the tank.

The main stream is conveyed to a consumer. The secondary stream in the form of a heating gas stream flows through the cryogenic tank in a pipe, thus serving to raise the pressure in the tank by introducing heat. In order to regulate the throughputs of the main stream and of the secondary stream, each stream is provided with an adjustable throttle by means of which the minimum free flow cross section for the main stream and for the secondary stream can be adjusted. The two throttles are coupled to each other in such a manner that an enlargement in the flow cross section of one throttle is associated with a reduction in the flow cross section of the other throttle and vice-versa. The secondary stream is adjusted by means of the first throttle as a function of the pressure in the tank. Since the first throttle is coupled to the second throttle for the main stream, any change in the free flow cross section of the first throttle simultaneously influences the free flow cross section for the main stream. In this manner, the method according to the invention allows a very simple regulation of the main and secondary streams while the pressure in the tank is kept largely constant by a single pressure-control means. If the pressure in the tank is too low, the throttle for the secondary stream is opened or opened further and, simultaneously, the throttle for the main stream is cut back. By increasing the throughput for the secondary stream, a greater quantity of heat is introduced into the cryogenic tank, thus causing the pressure to rise. This pressure rise, in turn, causes the first throttle to close, thus correspondingly reducing the secondary stream while, at the same time, enlarging the flow cross section for the main stream.

It turned out to be particularly simple to employ an approach in which a primary gas stream from which the main stream and the secondary stream are branched off is withdrawn from the cryogenic tank. The main stream and the secondary stream are branched off from a shared primary gas stream. As a consequence, only one withdrawal line is needed. The throughputs for the main stream and for the secondary stream are regulated by the pressure-control means which, seen in the direction of flow of the primary gas stream, is arranged downstream from the branch-off site.

It has proven to be advantageous to employ a three-way pressure regulator as the pressure-control means and to feed the main stream to a first gas inlet and the secondary stream to a second gas inlet of the three-way pressure regulator. Accordingly, the three-way pressure regulator is fitted with two gas inlets and one gas outlet in the direction of the consumer, whereby the main stream and the secondary stream are conveyed to the three-way pressure regulator separately from each other. If there is a pressure gradient between the pressure tank and the three-way pressure regulator, this approach makes it possible to convey both gas streams in the direction of the pressure gradient so that auxiliary means such as, for example, blowers or pumps, are not needed in order to generate the gas flow. Such a pressure gradient can be created, for instance, by heating up the cold or liquefied gas contained in the cryogenic tank. The heating causes the gas density to decrease so that the volume and the tank pressure increase correspondingly.

Advantageously, the secondary stream is fed through the cryogenic tank, it is subsequently re-heated and then conveyed to the second gas inlet of the pressure-control means. The secondary stream cooled off in the cryogenic tank can be heated up, for example, in a heat exchanger that is kept at room temperature without the need for additional heating material. Heating up the tank contents by means of the secondary stream generates a pressure gradient so that the secondary stream flows in the direction of the pressure-control means without any auxiliary energy.

Another improvement can be achieved if the secondary stream—seen in the direction of flow—is added to the main stream in the area downstream from the first throttle. This approach entails the advantage that, when the first throttle is open—and the free flow cross section for the main stream is correspondingly reduced—the gas that flows through the first throttle can likewise be conveyed to the consumer. This makes it easier to maintain the main stream for the consumer and avoids gas losses.

In the case of one method variant in which the gas is present in the cryogenic tank in a liquid phase and in a gaseous phase, it has proven to be advantageous to withdraw the main stream for the consumer from the gaseous phase. Even though withdrawing liquid gas from the cryogenic tank requires relatively less energy to maintain the tank pressure, evaporation pulsations can occur in an evaporator located downstream. In contrast, with the method variant according to the invention, no liquid is withdrawn from the cryogenic tank, but rather cold gas. Therefore, the liquid is already evaporated in the cryogenic tank. The larger liquid volume in the cryogenic tank prevents evaporation pulsations, thus functioning as a dampening volume in this case. Therefore, in the device suitable for this purpose, the withdrawal line used to withdraw the main stream for the consumer does not protrude into the liquid phase, but rather, it opens up into the gas phase located above.

The method according to the invention has proven its worth particularly for regulating the tank pressure when liquefied hydrogen, liquefied nitrogen or liquid natural gas are employed as the gas.

As far as the device is concerned, the above-mentioned objective is achieved according to the invention in that the pressure-control means has a first adjustable throttle to regulate the secondary stream and a second adjustable throttle to regulate the main stream, whereby the throttles are coupled to each other in such a way that they are opened and closed in opposite directions as a function of the pressure in the tank.

The main stream is conveyed to a consumer. The secondary stream in the form of a heating gas stream flows through the cryogenic tank in a pipe, thus serving to raise the pressure in the tank by introducing heat. The secondary stream is regulated as a function of the pressure in the tank. In order to regulate the throughputs of the main stream and of the secondary stream, each stream is provided with a throttle of a shared pressure-control means with which the minimum free flow cross section for the main stream and for the secondary stream can be adjusted. The two throttles are coupled to each other in such a manner that an enlargement in the flow cross section of one throttle is associated with a reduction in the flow cross section of the other throttle and vice-versa. In this manner, the device according to the invention allows a regulation of the main and secondary streams while the pressure in the tank is kept largely constant by means of a single pressure-control means. If the pressure in the tank is too low, the throttle for the secondary stream is opened or opened further and, simultaneously, the throttle for the main stream is cut back. By increasing the through-put for the secondary stream, a greater quantity of heat is introduced into the cryogenic tank, thus causing the pressure to rise. This pressure rise, in turn, causes the first throttle to close, thus correspondingly reducing the secondary stream while, at the same time, enlarging the flow cross section for the main stream. This creates a self-regulating system.

It has proven to be advantageous to configure the pressure-control means as a three-way pressure regulator equipped with a gas outlet, a first gas inlet for the main stream and a second gas inlet for the secondary stream. Accordingly, the three-way pressure regulator is fitted with two gas inlets and one gas outlet in the direction of the consumer, whereby the main stream and the secondary stream are conveyed to the three-way pressure regulator separately from each other. If there is a pressure differential between the tank and the three-way pressure regulator, this embodiment of the device according to the invention makes it possible to convey both gas streams in the direction of the pressure gradient without additional auxiliary energy so that, for example, blowers or pumps, are not needed. Such a pressure gradient can be created, for instance, by introducing heat into the cryogenic tank, for example, by feeding heated gas through the cryogenic tank. The heating causes the gas density to decrease so that the volume and the tank pressure increase correspondingly.

An embodiment of the device according to the invention can be designed particularly simply and cost-effectively in that the first throttle and the second throttle are mechanically connected to each other by means of a coupling element that can move as a function of the pressure in the tank.

A suitable coupling element comprises a valve rod that can be moved along its lengthwise axis as a function of the tank pressure and on which a first valve cone and a second valve cone are held at a distance from each other, whereby the throttles—each having a valve seat as the receptacle for one of the valve cones—are opened or closed by moving the valve rod. The valve rod is an elongated component, for instance, a cylinder, a hollow cylinder or a cone on which at least two valve cones are rigidly or moveably attached. The position of the valve rod and thus the position of the valve cone are established as a function of the tank pressure in conjunction with a pre-specified target pressure. Moving the valve rod causes one of the valve cones to move in the direction of its valve seat, thus reducing the free flow cross section of the throttle in question while the free flow cross section of the other throttle is enlarged, so that the valve seats of the first and second throttles are opened and closed in opposite directions when the valve rod is moved. The term valve cone as defined in this invention refers to a closing element that, in conjunction with the corresponding valve seat, is capable of changing the free flow cross section of a throttle. To this end, it is not necessary for the valve cone to have the shape of a cone in the geometrical sense.

Advantageously, the valve rod extends between an upper pressure chamber where the tank pressure prevails and a lower, closed pressure chamber where a pre-specified target pressure prevails and where a pressure element acts upon the valve rod. This pressure element can be a mechanical component, for example, a membrane, a spring or a bellows, or else a gaseous or liquid pressure spring. The pressure differential between the tank pressure and the target pressure determines the position of the valve rod. This pressure differential can be adjusted particularly easily in that the valve rod has a drill hole that creates a fluid connection between the upper and the lower pressure chambers, in other words, it is sealed off towards the outside.

Another improvement can be achieved when the drill hole is provided with a restricted flow zone. This restricted flow zone serves to dampen vibrations caused by pressure fluctuations.

It has proven to be especially advantageous to pass the valve rod through at least two guide elements arranged at a distance from each other. These guide elements prevent the valve rod from tilting, thus ensuring a precise axial movement of the valve cones in the direction of the lengthwise axis of the valve rod.

A particularly simple embodiment of the device according to the invention is one in which the pressure-control means has a housing with a removable top part and a bottom part, whereby one of the guide elements is configured in the top part while the other guide element is configured in the bottom part. The removable top part allows a simple assembly of the valve rod.

Advantageously, the surface of at least one of the valve cones is made completely or partially of plastic, preferably polyamide. The valve cone can consist of plastic in its entirety. However, at least in those surface areas that come into contact with the corresponding valve seat, it is provided with a plastic layer. This prevents or reduces noises that might occur due to vibrations of the valve cone in its appertaining valve seat. As an alternative or as a complement to this, the valve seat can also be provided with an appropriate plastic surface.

Figure 2:
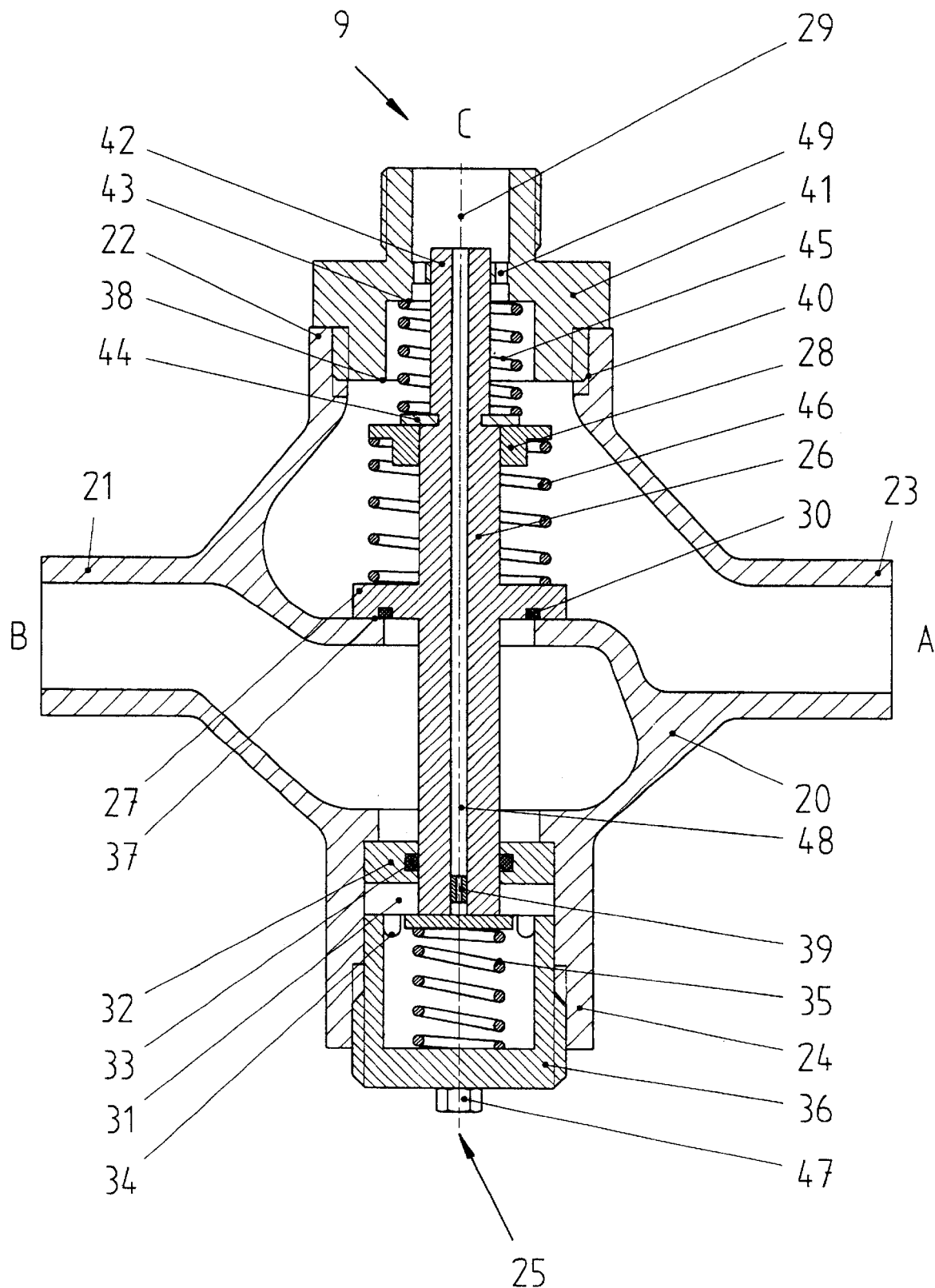

The invention will be elaborated upon below with reference to embodiments and a patent drawing. The drawings show the following in a schematic representation:

FIG. 1—a system to regulate the pressure in an automobile tank for liquid hydrogen, and FIG. 2—a three-way pressure regulator suitable for the pressure control system according to FIG. 1.

The cryogenic tank 1 shown in FIG. 1 consists of a reservoir 2 for deep-frozen, liquid hydrogen 4 having a holding capacity of 100 liters and a vacuum insulation jacket 3. A withdrawal line 5 extends vacuum-tight through the insulation jacket 3 and said line is used to withdraw hydrogen from the reservoir 2. The withdrawal line 5 ends in the gas phase 4a above the surface of the liquid. The withdrawal line is connected to a pressure gage 6 that displays the tank pressure in the reservoir 2, which is set at 5 bar. The withdrawal line 5 passes through a first heat exchanger 7 in which the withdrawn, cold hydrogen is heated up. The heat exchanger 7 is a plate-like heat exchanger that is kept at an elevated temperature (above room temperature). Subsequently, the withdrawal line 5 branches off into a main stream line 8 through which a first partial stream (hereinafter referred to as "main stream") is conveyed via a three-way pressure regulator 9 to a consumer, and into a heating gas line 10 through which another partial stream (hereinafter referred to as "secondary stream") consisting of gaseous, heated hydrogen is conveyed to a convector 11 arranged inside the reservoir 2. In order to convey the secondary stream into the convector 11, there is a vacuum-tight passage for the heating gas line 10 through the insulation jacket 3. The convector 11 in the embodiment is configured as a coiled stainless-steel pipe having a length of 1 meter and an inner diameter of 12 mm. Leading from the convector 11, which is at least partially immersed into the liquid hydrogen 4, another vacuum-tight passage leads via a line 12 to a second heat exchanger 13, and from there, via a secondary stream line 14 to the three-way pressure regulator 9. This three-way pressure regulator 9 has three connections whereby, in FIG. 1, the gas inlet for the main stream line 8 is designated with the reference letter "C", the gas inlet for the secondary stream line 14 with "B" and the gas outlet to the consumer with "A". The direction of flow of the consumer gas stream is indicated by the directional arrow 15.

An embodiment of the three-way pressure regulator 9 and an example of its mode of operation will be explained in greater detail below with reference to the schematic depiction in FIG. 2.

The housing 20 of the three-way pressure regulator 9 has a union fitting 21 for the secondary stream line 14 (FIG. 1), a union fitting 22 for the main stream line 8 (FIG. 1), a union fitting 23 for the user gas stream and a receptacle 24 for a set-point adjuster 25. Inside the housing 20, there is a control element in the form of a hollow-cylindrical valve rod 26 that can be moved along its lengthwise axis 29. A first valve cone 27 is rigidly held on the valve rod 26 while a second valve cone 28 is frictionally held on the same rod. The two valve cones 27, 28 are associated with a first valve seat 37 and a second valve seat 38, respectively, whereby valve cones 27, 28 and their matching valve seats 37, 38 form a first throttle means (27, 37) or a second throttle means (28, 38). The second throttle means (28, 38) defines the free flow cross section for the main stream from "C" to "A" while the first throttle means (27, 37) specifies the free flow cross section for the secondary stream from "B" to "A". The throttle means (27, 37) or (28, 38) are opened or closed by moving the valve rod 26 up or down, that is to say, the appertaining flow cross sections are enlarged or reduced. In this context, the first valve seat 37 is fitted with an elastomeric gasket 30 so that the first throttle means (27, 37) can be closed gas-tight by lowering the first valve cone 27. In contrast, the second throttle means (28, 38) is not completely closed as a rule. In order to avoid noises when opening or closing the second valve seat 38, the second valve cone 28 is made of polyamide.

The lower end of the valve rod 26 extends through a guide element 32 into a pressure chamber 31 that is formed in the receptacle 24 of the housing 20. The pressure chamber 31 is sealed gas-tight towards the top by means of the guide element 32 which, to this end, is fitted with a gasket 33 that lies against the valve rod 26. Towards the bottom, the pressure chamber 31 is limited by a membrane 34 that lies against the lower face of the valve rod 26. The membrane 34 is operatively connected to a spring element 35 and the latter, in turn, is operatively connected to a housing insert 36. The target value for the tank pressure on the top of the membrane 34 facing the spring element 35 is generated by means of the spring element 35 and the housing insert 36, which has an outer thread and which can be moved along the lengthwise axis 29 by means of an adjusting screw 47. The valve rod 26 has an inner drill hole 48 by means of which a pressure connection is established between the pressure chamber 31 and the pressure that prevails at the upper end of the valve rod 26 and that, aside from a pressure drop via the line 8 (FIG. 1), corresponds approximately to the pressure in the tank. As a result, a pressure that approximately corresponds to the tank pressure is exerted on the bottom of the membrane 34 that faces the valve rod 26. The pressure differential between the target pressure and the tank pressure determines the type and extent of deformation of the membrane 34 and thus the axial position of the valve rod 26 and of the valve cone 27, 28 held thereon.

In order to generate a restricted flow zone 39, the inner drill hole 48 is locally constricted. Thanks to this restricted flow zone 39, the effect of brief fluctuations in the tank pressure is delayed in the pressure chamber 31 and thus dampened.

The union fitting 22 for the main stream line 8 (FIG. 1) is provided with an inner thread 40 into which the sleeve-like top part 41 is screwed. The upper end 42 of the valve rod 26 protrudes into the opening of the top part 41 that is configured as a guide element 49 in one inner area. This guide element 49 allows precise axial movement of the valve rod 26 with little friction while concurrently retaining the largest possible free flow cross section for the main stream from "C" to "A". A pressure spring 45 that imparts the valve rod 26 with the restoring force against the first spring element 35 is fitted between a recess 43 in the axial opening of the top part 41 and a lock washer 44 that is frictionally connected to the valve rod 26. The pressure spring 45 also fulfills a safety function against excess pressure between the cryogenic tank 1 and the three-way pressure regulator 9, which will be explained in greater detail below with reference to a description of the function.

A third spring element 46 is provided between the first valve cone 27 and the second valve cone 28. In special cases, the distance between the two valve cones 27, 28 can be changed by means of the spring element 46. Further explanations on this measure can be gleaned from the following description of the function of the three-way pressure regulator 9 according to the invention.

The main stream flows through the three-way pressure regulator 9 from "C" to "A", while the secondary stream, that is to say, the partial stream that is fed through the convector 11 (FIG. 1), flows from "B" to "A". The main stream and the secondary stream are regulated by means of the two throttle means (27, 37) and (28, 38) so as to flow in opposite directions. To this end, the valve cones 27, 28 are mechanically coupled to each other via the valve rod 26. As a result, when the tank pressure rises above the target pressure, the membrane 34 is deformed as a function of the force equilibrium, which is made up of the pressure on the membrane 34 and of the opposing force of the spring element 35, and then the membrane 34 correspondingly moves the valve rod 26 that lies against it downwards (in the view shown in FIG. 2). As a result, the second throttle means (28, 38) is opened and the free flow cross section for the main stream is enlarged while, conversely, the first throttle means (27, 37) is closed, so that little or no gas flows through the convector 11, thus preventing any further pressure rise in the reservoir 2 (FIG. 1). When cold gas is withdrawn from the reservoir 2, the pressure in the tank drops correspondingly, so that the valve rod 26 is pushed upwards. As a result, the first throttle means (27, 37) is opened and the free flow cross section for the secondary stream is enlarged, whereas the free flow cross section for the main stream is somewhat reduced by means of the second throttle means (28, 38). Owing to the now stronger secondary stream, more heat is introduced into the cryogenic tank, thus causing the pressure in the tank to rise, which is also associated with a higher pressure in the area of the gas outlet "A" to the consumer. The higher tank pressure, in turn, causes the valve rod 26 to move downwards, thus correspondingly reducing the secondary stream and enlarging the main stream. This gives rise to a self-regulating system whereby the opening of the second throttle means (28, 38) can ensure a sufficient throughput of the main stream, without a marked pressure drop occurring in the area of the gas outlet "A". Another contributing factor here is the coupling of the two throttle means (27, 37), (28, 38) in opposite directions whereby, when the first throttle means (27, 37) is open (which brings about a reduced flow cross section for the main stream), the secondary stream from "B" to "A" is fed to the consumer along with the main stream.

In order to minimize any pressure drop in the area of the gas outlet "A" in case of high, brief throughputs to the consumer, the two valve cones 27, 28 are not affixed rigidly with respect to each other on the valve rod 26, but rather, they are arranged so that they can be moved with respect to each other by means of the spring element 46. This has the advantage that, in the case of a brief increased withdrawal at consumer A, the top valve cone 28, by virtue of the increased pressure differential a, can move the cone 28 downwards opposite to the spring element 46, thus further opening the second throttle means (28, 38) for the main stream, even when the throttle means (27, 37) for the secondary stream is open. As a consequence, in cases of highly dynamic processes such as a brief high withdrawal of gas at consumer A, it is possible to prevent the pressure in the withdrawal line to the consumer from dropping excessively. This mode of operation is particularly advantageous when brief, high throughputs are needed at consumer "A" such as, for example, during acceleration procedures (reserve of seconds). In this process, the gas volume in the withdrawal line 5 and in the main stream line 8 (FIG. 1) is utilized as a short-term buffer.

The pressure spring 45 also fulfills a safety function against excess pressure between the cryogenic tank 1 and the three-way pressure regulator 9. This is particularly true of the operating case when only a minimum amount of gas is being withdrawn from gas outlet "A", for example, when the hydrogen motor is idling. In such a case, the first throttle means (27, 37) is completely closed, whereby the gasket 30 prevents any leakage and thus unnecessary heating up of the cryogen tank. Here, however, the hydrogen present in the secondary stream line 14 (FIG. 1) can be heated up so that the pressure rises. In order to prevent a backflow of the heated hydrogen into the cryogenic tank, the secondary stream line 14 is fitted with a non-return valve (not shown in the figure). If the pressure rises beyond a specifiable limit value, the first valve cone 27 functions as a safety valve in that the pressure at the gas inlet "B" generates a force on the effective surface of the valve cone 27, and this force then opens the valve seat 37 against the downward force of the pressure spring 45, thus allowing the heated gas to escape from the secondary stream line 14.

In an alternative embodiment (not shown in FIG. 2) of the three-way pressure regulator 9, there is no inner drill hole 48 and no gasket 33. This creates a fluid connection between the pressure chamber 31 and the gas inlet "B". Here, regulation takes place by comparing the pre-specified pressure target value with the pressure at the gas inlet "B". The pressure differentials between the tank pressure and the pressure at the gas inlet "B" are normally so slight that this embodiment likewise exhibits good regulation characteristics. In an advantageous variant of this, the fluid connection between the pressure chamber 31 and the gas inlet "B" is created by a passage opening in the guide element 32; the gasket 33 can be retained in this case.

What is claimed is:

1. In a method of regulating the pressure inside a cryogenic tank containing cold gas including withdrawing a main stream for a consumer, regulating a heated gas in the form of a heating gas secondary stream as a function of the tank pressure, and feeding the secondary stream through the cryogenic tank via a pipe, the improvement being in conveying the secondary stream and the main stream to a pressure regulator having a first adjustable throttle for the secondary stream and having a second adjustable throttle for the main stream, coupling the throttles to each other, and opening and closing the throttles in opposite directions as a function of the pressure in the tank.

2. The method according to claim 1, including withdrawing from the cryogenic tank a primary gas stream branched off from the main stream and the secondary stream.

3. The method according to claim 2, including employing a three-way pressure regulator as the pressure regulator, and feeding the main stream to a first gas inlet and the secondary stream to a second gas inlet of the three-way pressure regulator.

4. The method according to claim 3, including feeding the secondary stream through the cryogenic tank, and heating and subsequently conveying the secondary stream to the second gas inlet of the pressure-control means.

5. The method according to claim 3, including employing a three-way pressure regulator as the pressure regulator which is coupled to a car engine, and feeding the main stream to a first gas inlet and the secondary stream to a second gas inlet of the three-way pressure regulator.

6. The method according to claim 1, including adding the secondary stream—as seen in the direction of flow of the secondary stream—to the main stream in the area downstream from the first throttle.

7. The method according to claim 1, including providing the gas present in the cryogenic tank in a liquid phase and in a gaseous phase, and withdrawing the main stream for the consumer from the gaseous phase.

8. The method according to claim 1, including using as the gas a gas selected from the group consisting of liquefied hydrogen, liquefied nitrogen and liquid natural gas.

9. In a device to regulate the pressure inside a cryogenic tank when at least one main stream for a consumer is withdrawn, said device having a thermally insulated reservoir to hold a cold gas that is connected to a withdrawal line that serves to withdraw a gas stream, said device having a device to heat up the gas stream, said device having a pipe that runs through the reservoir, and said device having a pressure regulator with which the gas stream in the form of a heating gas secondary stream is regulated as a function of the tank pressure and is fed through the cryogenic tank via said pipe, characterized in that the pressure regulator is equipped with a first adjustable throttle to regulate the secondary stream and with a second adjustable throttle to regulate the main stream, and said throttles are coupled to each other in such a way that they can be opened and closed in opposite directions as a function of the pressure in the tank.

10. The device according to claim 9, characterized in that a main stream line that serves to withdraw the main stream and a secondary stream line that serves to withdraw the secondary stream are branched off from the withdrawal line.

11. The device according to claim 9, characterized in that said pressure regulator is configured as a three-way pressure regulator that has a gas outlet a first gas inlet for the main stream and a second gas inlet for the secondary stream.

12. The device according to claim 9, characterized in that said first throttle and said second throttle are mechanically connected to each other by means of a coupling element that can move as a function of the pressure in the tank.

13. The device according to claim 12, characterized in that said coupling element comprises a valve rod that can be moved along its lengthwise axis as a function of the tank pressure and on which a first valve cone and a second valve cone are held at a distance from each other, and each of said throttles having a valve seat as the receptacle for one of said valve cones to be opened and closed by moving said valve rod.

14. The device according to claim 13, characterized in that said valve rod extends between an upper pressure chamber where the tank pressure prevails and a lower closed pressure chamber where a pre-specified target pressure prevails and in which a pressure element acts upon said valve rod.

15. The device according to claim 13, characterized in that said valve rod has a drill hole that creates a fluid connection between said upper and the lower pressure chambers.

16. The device according to claim 15, characterized in that said drill hole is provided with a restricted flow zone.

17. The device according to claim 15, characterized in that the surface of at least one of said valve bodies is made at least partially of plastic.

18. The device according to claim 17, characterized in that said plastic is polyamide, and said pressure regulator being coupled to a car engine.

19. The device according to claim 13, characterized in that said valve rod is passed through at least two guide elements arranged at a distance from each other.

20. The device according to claim 19, characterized in that said pressure regulator has a housing with a removable top part and a bottom part, and one of said guide elements is configured in said top part while the other guide element is configured in said bottom part.

* * * * *